Aug. 8, 1939. M. B. WOOD 2,168,815
FUSIBLE CIRCUIT INTERRUPTER
Original Filed July 20, 1935

Inventor.
Morris B. Wood
By T. T. Greenwood
ATTORNEY

Patented Aug. 8, 1939

2,168,815

UNITED STATES PATENT OFFICE 2,168,815

FUSIBLE CIRCUIT INTERRUPTER

Morris B. Wood, Newbury, Mass., assignor to The Chase-Shawmut Company, Newburyport, Mass., a corporation of Massachusetts Application July 20, 1935, Serial No. 32,385
Renewed September 30, 1938

38 Claims. (Cl. 200—123)

This invention relates to circuit interrupters and fuses especially adapted to protect an electrical circuit, and apparatus therein, from deleterious effects of overloads and short-circuits.

A momentary overload or one of short duration ordinarily is not harmful either to the apparatus or to the circuit unless allowed to persist for a dangerous period of time. Hence it is usually desirable for a protective device to maintain the circuit closed for a considerable time when traversed by a moderate overload. When the protective device is in the circuit of relatively small "across the line" motors, for instance, the device is intended to maintain the circuit closed during the time that the motor requires to come up to normal speed and at such time takes many times normal full load current. A short-circuit, however, is often permanent and hence the circuit should be opened promptly to protect the apparatus and the circuit structure from harm.

It is preferable for many purposes to provide a protective device capable of discriminating between overload and short-circuit currents and an object of the present invention is an improved protective device using a quick acting fusible link or the equivalent for protection against short-circuits and a slow acting thermo-responsive circuit interrupter of the type having its circuit-interrupting member restrained releasably in circuit-closed position by a normally solidified mass of low melting point metal for protection against long continued overloads.

A further object is the provision of a thermo-responsive circuit interrupter of the class described wherein the fusible metal mass is carried by a contact thereof and wherein a novel arrangement of heating element in series with the contact is provided for heating the contact and metal mass.

It is an object of the present invention to provide a circuit interrupting device that is structurally disassociated from the heating device although capable of being placed in heat receiving relation therewith so that a circuit interrupter of one capacity may be exchanged for a circuit interrupter of a different capacity and associated with the same heating element, thereby reducing the cost of the devices.

A further object of the invention is the provision of a protective device wherein the thermal circuit interrupter is contained within a casing and wherein the heating element is carried by a separate casing or support which is adapted to be screw-threaded into the bottom of a socket and to receive upon it the circuit interrupter casing and to be in heat imparting relation with the circuit interrupter so as to heat the fusible metal body thereof. Since the circuit interrupter usually is thrown away after it is operated to open the circuit this arrangement represents an economy as there is less material that is discarded.

A further object of the invention is the provision of a heating device in a supporting plug or disc that is adapted to be located in the bottom of the interiorly screw-threaded shell of a socket and a thermal protective device separate from the heater element and adapted to be screw-threaded into the socket shell above and into contact with the heater element and to be operated by the heat received therefrom.

A further object is generally to improve the construction and operation of protective devices.

Figure 1:
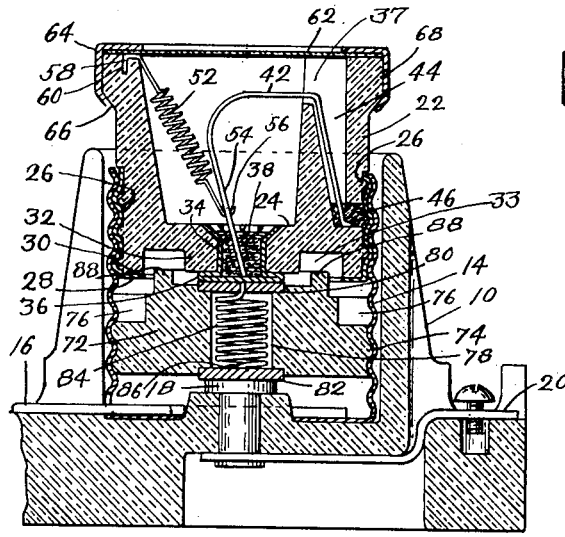
Fig. 1 is a sectional elevation of a thermal circuit interrupter embodying the present invention in position in a screw-threaded socket.
Figure 2:
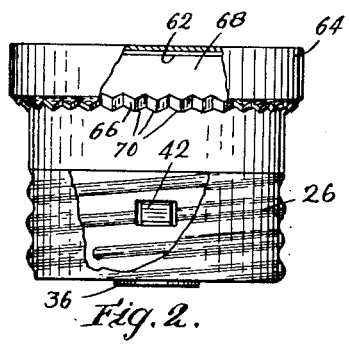
Fig. 2 is a side elevation partly broken away of a circuit interrupter of Fig. 1.
Figure 3:
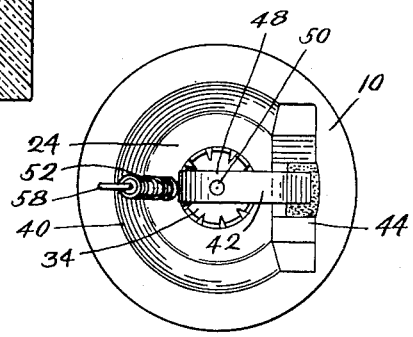
Fig. 3 is a plan view of the device of Fig. 2.
Figure 4:
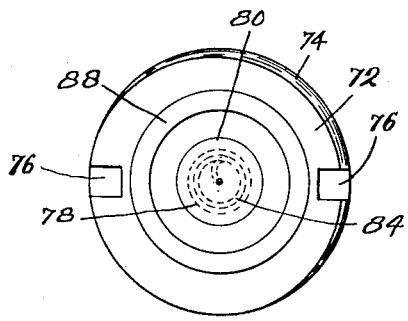
Fig. 4 is a plan view of the heater element disc.
Figure 5:
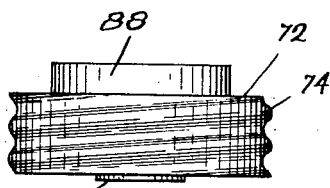
Fig. 5 is an elevation of the disc.

The thermal circuit interrupter embodying the present invention is especially adapted, although not necessarily limited, for insertion in a socket 10 that is adapted to receive a plug type fuse. Said socket has an internally screw-threaded shell 14 connected to one terminal 16 of an electric circuit and a center contact 18 at the bottom of the shell connected to another terminal 20.

The thermal circuit interrupter comprises a generally cylindrical chambered casing or body 22 formed of suitable insulating material and having a bottom wall 24 that, as herein illustrated, is integral with the remainder of the body. The lower part of said body is provided with an externally screw-threaded shell 26 that constitutes one terminal of the device. The shell is cemented or otherwise suitably secured to the body and has an inturned bottom flange 28 that underlies an annular rib 30 projecting from the bottom wall of the body. The bottom wall 24 is provided with a projecting annular boss 32 that is within and is concentric with the rib 30 so that a shallow annular channel 33 is formed between the rib and boss. The boss 32 carries a contact 34 which has a head 36 that overlies the bottom face of the boss and projects through the bottom wall 24 into the chamber 37 and is suitably secured in position in said wall. The center contact member is tubular at its inner end and thus provides a well for a mass or body 38 of readily fusible metal adapted to melt at a suitably low temperature. A circuit interrupting member comprising a fusible link 42 is located in said chamber and has its inner end immersed in the solidified mass of fusible metal 38 and by it retained releasably in electrical connection with the center contact. The outer end of the fusible link is located in a vertical channel 44 which extends through the side wall of the body to the inner face of the screw-threaded shell 26 and is soldered to said shell by a mass of solder 46. The solder also acts as a key to lock the shell against movement on the plug body.

The fusible link 42 is provided with a more readily fusible portion 48 formed in any suitable manner as by a perforation 50 located in about the middle part of the fuse link. The capacity of the fuse link is adapted to be such that the readily fusible part remains intact when traversed by a current continued for a sufficient period of time to effect the melting of the fusible body 38 but is adapted to melt or blow substantially instantaneously and before the fusible body 38 can melt when traversed by a heavy overload or short-circuit current.

A spring 52 is associated with the inner end 54 of the fusible link to withdraw said end rapidly out of the body 38 when said body becomes liquid, whereby to interrupt the circuit through the device. The spring 52 has its lower end suitably connected to the link end 54 as by having its lower end bent into a hook 56 and passed loosely through a small opening in the fuse link. The upper end of the spring is provided with a hook 58 which is located in a passage 60 formed in the top face of the plug body on the side opposite the channel 44. The open top of the chamber 37 is closed by a transparent, as a mica, window 62, which is held in place by a metal cap 64 turned down over and under the bottom shoulder 66 of the outstanding annular flange 68 formed at the top of the plug body. The shoulder 66 preferably is formed or provided with teeth 70 forming locking means for the cap 64 and venting passages for the chamber 37.

The heating device for the fusible mass is structurally independent of the plug above described. The heating device comprises an insulating body or disc 72 that is provided with external screw-threads 74 fitting the internal screw-threads of the shell 26 and adapted to be screw-threaded into the shell to lie in the bottom thereof. The upper face of the disc is provided with a pair of wrench receiving apertures 76 adapted to be engaged by the prongs of a suitable wrench to screw the disc into and out of the socket. Once the disc is in place in the bottom of the socket there is no necessity for subsequently removing it. If desired the disc may be located irremovably in the bottom of the socket by any suitable means old in the art and not necessary to illustrate herein. The disc is provided with an axially located passage 78 therethrough and the top and bottom faces of the disc are provided with annular recesses which surround the ends of the passage and in which upper and lower contact plates 80 and 82 are located and in which recesses said plates may be cemented or otherwise fixed. Preferably the outer faces of said contact plates project beyond the corresponding end faces of the disc. The bottom contact plate 82 is adapted to engage the center contact member 18 of the socket while the upper contact plate 80 is adapted to be engaged by the center contact member 34 of the plug body.

A heating element 84 is located within said passage 78 and serves to connect said plates 80 and 82 electrically and is in heat imparting relation with at least the upper plate 80. Said heating element, as herein illustrated, consists of an open helix of resistance wire of suitable dimensions to carry the current of any interrupter with which it is intended to be associated and to supply sufficient heat to the interrupter to melt the fusible body within a predetermined time when traversed by a predetermined current. The bottom end of the helix is secured to the lower plate 82 in any suitable manner as by a mass 86 of hard solder or other material that will not release the heating element at the maximum operating temperature thereof. The upper end of the helix is passed through an opening in the upper contact member 80 and is soldered or otherwise secured thereto in a similar manner.

As thus arranged the heat of the heating element is imparted to the upper contact member or plate 80 which in turn imparts the heat to the center contact member 34 of the plug body, thereby heating the readily fusible body 38. When the heating element is traversed by a sufficient current, corresponding to a moderate overload, the temperature of the fusible metal body gradually rises and said body ultimately fuses and releases the inner end 54 of the fusible link, whereupon said end is pulled rapidly out of the liquid body by the spring 52, thereby interrupting the circuit. If the device is traversed by an excessively heavy current corresponding to a short-circuit the readily fusible part 48 of the fuse link ruptures before there has been sufficient time for the fusible body 38 to fuse and the circuit is thereby interrupted.

Different plug bodies containing differently rated fusible links 42 and different masses of fusible metal or masses melting at different temperatures can be associated separately with the same heating device so that different degrees of protection may be given the circuit without changing the heating device. Furthermore, the heating device is not discarded when an operated interrupter is replaced by a new one.

The disc 72 of the heating device is provided with a raised part as an annular rib 88 which is located in the channel 33 of the plug body and upstands slightly above the upper contact member 80 so as to prevent the contact member and the screw-threaded shell 26 of the socket from being bridged readily by a metallic plate, as a coin.

I claim:

1. A thermal circuit interrupter comprising a body having an exposed contact member provided with a well, a mass of readily fusible metal in said well, a circuit terminal, a circuit controlling member imbedded in said metal mass and retained thereby in a predetermined position and connecting said contact member and terminal, spring means excluded from the circuit between said contact member and terminal and acting on said circuit controlling member to separate it from the fused metal mass, and a heating element for fusing said metal mass and releasing said circuit controlling member, said heating element being in heat imparting relation with said metal mass and in series with said contact member.

2. A thermal circuit interrupter as in claim 1, said heating element being structurally independent of but thermally associated with said circuit interrupter and contact member and comprising an insulating member having an internal heating member and an exposed contact member electrically cooperating with said first-named contact member and having a part extended into said insulating member into heat receiving relation with said heating member.

3. A thermal circuit interrupter comprising a supporting body having an exposed contact member containing a well, a mass of readily fusible metal in said well, a screw shell circuit terminal on said body, a movable circuit conductor releasably retained by said metal mass in circuit closed contact therewith and connecting said contact member and terminal, spring means excluded from the circuit between said contact member and terminal and acting on said circuit controlling member to separate it from the fused metal mass, and a heating element in heat imparting relation with said contact member and metal mass and in series with said contact member and conductor, said heating element being capable of fusing said metal mass and releasing said conductor.

4. A thermal circuit interrupter as in claim 3, said heating device being structurally independent of said contact member and supporting body and adapted for thermal association with said contact member and comprising an insulating member having an internal heating member and an exposed contact member electrically cooperating with said first-named contact member and having a part extended into said insulating member into heat receiving relation with said heating member.

5. A thermal circuit interrupter as in claim 3, said heating device being structurally independent of said contact member and supporting body and adapted for thermal association with said contact member, and said conductor comprising a fusible link, the arrangement being such that the fusible link and the metal mass fuse in response to different types of overload currents.

6. A thermal circuit interrupter comprising a supporting body having a terminal and a heated terminal carrying a mass of readily fusible metal, a conductor electrically connecting said terminals and having its end imbedded in said readily fusible metal mass and retained removably in engagement therewith by the normally solidified condition of said mass, spring means excluded from the circuit between said terminals acting on said conductor to separate it from the fused metal mass, said heated terminal adapted to be heated for melting said fusible mass and releasing said conductor to interrupt the circuit through the interrupter.

7. A thermal circuit interrupter of the plug fuse type comprising a supporting body having a screw-threaded terminal shell and a center contact member containing a mass of readily fusible metal, a conductor connecting said contact member and terminal shell and having its end imbedded in said readily fusible metal mass and retained removably in engagement therewith by the normally solidified condition of said mass, and means external and structurally independent of said supporting body for heating said contact member and thereby melting said fusible mass and releasing said conductor, said means comprising an insulating body having screw threads and adapted to be screwed into a socket under said interrupter, said insulating body having a pair of center contacts adapted to engage respectively said center contact member and the center contact of the socket, and electrical heating means carried by said body in series with the center contacts thereof and in heating relation with that one adapted to be engaged by said center contact member of the interrupter.

8. A thermal circuit interrupter of the plug fuse type comprising a supporting body having a screw-threaded terminal shell and a center contact member containing a mass of readily fusible metal, a conductor connecting said contact member and terminal shell and having its end imbedded in said readily fusible metal mass and retained removably in engagement therewith by the normally solidified condition of said mass, and means external and structurally independent of said supporting body for heating said contact member and thereby melting said fusible mass and releasing said conductor, said conductor comprising a fusible link, the arrangement being such that said link and metal mass fuse with different types of overload currents.

9. A thermal circuit interrupter of the plug fuse type comprising a chambered supporting body having a screw-threaded terminal shell, a center contact containing a mass of readily fusible metal, a flexible conductor within the chamber having one end anchored to said shell and the other end imbedded releasably in said fusible mass and means associated with said conductor to remove said conductor from engagement with said mass upon the melting thereof and to flex said conductor, said contact member adapted to receive externally applied heat to effect the melting of said fusible mass.

10. A thermal circuit interrupter comprising a supporting body having terminals, a mass of readily fusible metal connected with one terminal, a fusible link connected with the other terminal and engaged with said metal mass and held thereby releasably in circuit closed position, and heating means for said metal mass structurally independent of the aforesaid elements and adapted for thermal association with and for fusing said metal mass, said link having less heat storage capacity than said metal mass and said mass having a lower melting point than said link.

11. A protective apparatus comprising the combination of a socket having terminal contacts, a heating device in said socket over one of said contacts, said device having two contacts one of which is engaged with a socket contact, and a thermo-responsive device removably positioned in said socket over and in removable heat receiving association with said heating device, said thermo-responsive device having contacts engaged with the free contacts of said socket and heating device.

12. A protective apparatus comprising the combination of a socket, a heating device in one part of said socket having a heating element and a heat conducting member heated by said heating element, and a thermo-responsive device removably supported in said socket independently of said heating device and having a heat conducting member arranged to receive heat from the heat conducting member of said heating device, and circuit interrupting means responsive to the heat of said last named heat-conducting member, said heating and thermo-responsive devices having cooperating separable contact members.

13. A protective apparatus comprising the combination of a socket, a heating device in one part of said socket having a heating element and a heat conducting member heated by said heating element, and a thermo-responsive device removably supported in said socket independently of said heating device and having a heat conducting member arranged to receive heat from the heat conducting member of said heating device and circuit-interrupting means responsive to the heating of said last named heat conducting member, said heat conducting members also comprising separable contact members which conduct current between said heating and thermo-responsive devices.

14. A protective apparatus comprising the combination of a socket having a screw-threaded terminal shell and a center contact, a heating device in said socket having a current conducting means including a heating element engaged with said center contact, and a thermo-responsive device having a screw-threaded terminal engaged with said shell and a heat conducting center contact engaged with the current conducting means of said heating device.

15. A protective apparatus comprising the combination of a socket having a screw-threaded terminal shell and a center contact member, a heating device in said socket having an exposed contact member, another contact member engaged with said center contact member and a heating element connected between said contact members and a thermo-responsive device having a screw-threaded terminal engaged with said shell, a center contact engaged with said exposed contact member, and means responsive to said heating element.

16. A protective apparatus comprising the combination of a socket having an internally screw-threaded terminal shell and a center contact member, a heating device in said shell having an exposed contact member, another contact member engaged with said center contact member, and a heating element connected between said contact members, and a thermo-responsive device having a screw-threaded terminal engaged with the screw-threads of said shell, a center contact engaged with said exposed contact member and receiving heat therefrom, and means responsive to the heat of said center contact.

17. A protective apparatus comprising the combination of an interiorly screw-threaded terminal shell, and a center contact member, a heating device comprising an externally screw-threaded disc screw-threaded in said shell having a lower contact member engaged with said center contact member, an upper contact member and a heating element connected between said contact members, said upper contact member receiving heat from said heating element, and a thermo-responsive device removably positioned in said socket having a screw-threaded terminal engaged with the screw-threads of said shell, a center contact engaged with said exposed contact member and receiving heat therefrom, and means responsive to the heat of said center contact.

18. A protective apparatus comprising the combination of a socket having an internally screw-threaded shell and a center contact member, a heating device located in the bottom of said contact and comprising an exteriorly screw-threaded disc engaged with the screw-threads of said shell, contact members exposed at the upper and lower faces of said disc, the lower contact member being engaged with said center contact member, a heater element carried by said disc and imparting heat to said upper contact member, and a thermo-responsive device in said socket above said heating device comprising a body having a screw-threaded shell engaged with the threads of said socket shell, a center contact member engaged with said upper contact member of said heating device and receiving heat therefrom, and means responsive to the heat of said center contact.

19. A protective apparatus comprising the combination of a socket having an internally screw-threaded shell and a center contact member, a heating device located in the bottom of said contact and comprising an exteriorly screw-threaded disc engaged with the screw-threads of said shell, contact members exposed at the upper and lower faces of said disc, the lower contact member being engaged with said center contact member, a heater element carried by said disc and imparting heat to said upper contact member, a thermo-responsive device in said socket above said heating device comprising a body having a screw-threaded shell engaged with the threads of said socket shell, a center contact member engaged with said upper contact member of said heating device and receiving heat therefrom, a fusible metal body carried by said center contact, and circuit interrupting means releasably connecting said screw-threaded terminal and said center contact through said fusible body.

20. A protective apparatus comprising the combination of a heating device including an externally screw-threaded insulating disc, upper and lower contact members exposed at the opposite faces of said disc, a heating element carried by said disc and connecting said contact members and arranged to heat said upper contact member, and a thermo-responsive device separate from but adapted for association with said heating device, said thermo-responsive device comprising a supporting body having an exteriorly screw-threaded terminal, a center contact adapted to engage the heated upper contact of said heating device, and circuit-interrupting means responsive to the heating of said center contact.

21. A protective apparatus comprising the combination of a heating device including an externally screw-threaded insulating disc, upper and lower contact members exposed at the opposite faces of said disc, a heating element carried by said disc and connecting said contact members and arranged to heat said upper contact member, and a thermo-responsive device separate from but adapted for association with said heating device, said thermo-responsive device comprising a supporting body having an exteriorly screw-threaded terminal, a center contact adapted to engage the heated upper contact of said heating device, means responsive to the heating of said center contact comprising a fusible metal body carried by said center contact, and circuit interrupting means connecting said screw-threaded terminal and said center contact and held releasably in circuit conducting position by the solid fusible body.

22. A heating device for a thermo-responsive protective apparatus having a heat-receiving contact and thermo-responsive circuit-controlling means operated by the heat thereof, said heating device comprising a supporting body, contact members carried thereby, and a heating element interconnecting said contact members, said heating element being in heat imparting relation with one of said contact members, which one is adapted for engagement with the contact of said protective apparatus, whereby to heat it and effect the operation of said circuit-controlling means.

23. A heating device for a thermo-responsive protective apparatus of the screw socket type, said heating device comprising a supporting body having external screw-threads, contact members carried by said body and exposed to access each from an opposite side of said body, and a heating element electrically interconnecting said contact members and arranged in heating relation with one of said contact members.

24. A heating device for a thermo-responsive apparatus of the screw socket type, said heating device comprising an externally screw-threaded supporting disc, contact members exposed on the opposite faces of said disc, and a heating element interconnecting said contact members and arranged in heat imparting relation with one of them.

25. A heating device for a thermo-responsive apparatus of the screw socket type, said heating apparatus comprising an externally screw-threaded insulating disc having a passage therethrough, contact plates carried by said discs on opposite faces thereof and overlying the ends of said passage, and a heating element disposed in said passage and interconnecting said contact plates and arranged in heat-imparting relation with one of said plates.

26. A thermo-responsive protective apparatus comprising a chambered insulating body having a screw-threaded terminal shell thereon and a center contact at the bottom adapted to receive external heat, said contact being recessed internally of the body and having a readily fusible metal mass in said recess, a flexible conductor having one end imbedded in said metal mass and its other end anchored to said terminal shell, and spring means associated with the imbedded end of said conductor and biased to move said end out of engagement with said metal mass when the latter is in its liquid state and to flex said conductor.

27. A thermo-responsive protective apparatus comprising a chambered insulating body having a screw-threaded terminal shell thereon and a center contact at the bottom adapted to receive external heat, said contact being recessed internally of the body and having a readily fusible metal mass in said recess, a conductor having one end imbedded in said metal mass and its other end connected with said terminal shell, and spring means associated with the imbedded end of said conductor and biased to move said end out of engagement with said metal mass when the latter is in its liquid state, said conductor comprising a fusible element and said fusible element and said fusible mass characterized by fusing in response to different overload conditions.

28. A thermal circuit interrupter comprising a cylindrical body having an internal closed chamber, an externally screw-threaded shell carried by said body, a center contact carried by said body, a fusible metal mass located in the body chamber in heat-conducting engagement with said center contact, and a fusible link in said chamber electrically connecting said shell and contact having a part releasably held by said solid fusible metal mass and spring means operative to withdraw said part from the fused metal mass.

29. A thermal circuit interrupter comprising a supporting body having a contact member containing a well, a mass of readily fusible metal in said well, a movable circuit conductor releasably retained by said metal mass in circuit closed contact therewith, and a heating element in heat imparting relation with said contact member and metal mass and in series with said contact member and conductor, said heating element being capable of fusing said metal mass and releasing said conductor and being structurally independent of said contact member and supporting body and adapted for thermal association with said contact member, and said conductor comprising a fusible link, the arrangement being such that the fusible link and the metal mass fuse in response to different types of overload currents.

30. A thermal circuit interrupter comprising an insulating body, a circuit terminal thereon, an exposed contact member having a chamber within said body providing a well, a fusible metal mass in said well, heating means for fusing said metal mass, a flexible electric conductor having one end anchored to said terminal and the other end anchored to said metal mass, and spring means connected between said conductor and body exerting tension on said flexible conductor to separate it from said fused metal mass.

31. Protective apparatus for electric circuits comprising a support, a pair of contact members carried by said support, a heating unit having a pair of contact members one of which is engaged with one of said support contact members and the other of which receives heat of said heat unit, and a fusible device comprising a casing having a pair of contact members one of which is engaged with the other contact member of said support and the other of which is engaged by said heated contact member of said heating unit, said fusible device having a fusible element in thermal relation with the contact member thereof associated with said heated contact member.

32. Protective apparatus for electric circuits comprising a base, a pair of contacts carried thereby, a heating unit including a pair of contact members having heating means in series therewith and imparting heat to one contact member thereof, the other contact member being engaged with a support contact member, and a fusible device having a pair of contact members and fusible conducting means in series therewith and in heat receiving relation with a contact member which is engaged with the heating contact member of said heating unit, said other contact member being engaged with the other contact member of said support.

33. A fusible protective device for electric circuits comprising a support, a pair of contact members carried by said support, a heating unit having a pair of contact members, and heating means in series therewith, one of said contact members being engaged with a contact member of said support, and a fusible device including a pair of contact members one of which is engaged with the free contact member of said heating unit and receives heat therefrom and the other of which is engaged with the other contact member of said support, and fusible conducting means connecting the contact members of said fusible device in series, said fusible conducting means being in heat receiving relation with said heated contact member thereof.

34. A heating device for a thermo-responsive protective apparatus having an exposed heat-receiving terminal, said heating device comprising a supporting body having contact members one of which is adapted to be in engagement with the terminal of said apparatus, and a heating element interconnecting said contact members and arranged in heat-imparting relation with the contact adapted to be engaged with said terminal.

35. A thermal circuit interrupter comprising exposed terminals, a conductor electrically connecting said terminals, a fusible mass adherent to said conductor and one exposed terminal and connecting them together and adapted to become heated and lose its hold on said conductor, and current-excluded spring means additional to said conductor and terminals responsive to the loss of holding power of said mass to effect separation of said conductor and fusible mass.

36. A thermal circuit interrupter comprising exposed terminals, a conductor electrically connecting said terminals, a fusible mass adherent to said conductor and one exposed terminal and connecting them together and adapted to become heated and lose its hold on said conductor, and spring means responsive to the loss of holding power of said mass to effect separation of said conductor and fusible mass, said conductor comprising a fusible link having a fusing part arranged to fuse prior to the loss of holding power of said mass when said link is traversed by a sufficiently heavy current.

37. A thermal circuit interrupter comprising an enclosing body having a center contact and a terminal, a conductor connected between said terminal and contact, a readily fusible metal adherent to said conductor and said contact and connecting them together, and current-excluded spring means additional to said conductor and terminal for separating said conductor and readily fusible metal when the latter melts.

38. A thermal circuit interrupter comprising an enclosing body having a center contact and a terminal, a conductor connected between said terminal and contact, a readily fusible metal adherent to said conductor and said contact and connecting them together, and spring means for separating said conductor and readily fusible metal when the latter melts, said conductor comprising a member having a portion adapted to fuse more quickly than said fusible metal when traversed by a sufficiently heavy current.

MORRIS B. WOOD.